United States Patent
Fleischer et al.

(10) Patent No.: US 9,535,694 B2
(45) Date of Patent: *Jan. 3, 2017

(54) VECTOR PROCESSING IN AN ACTIVE MEMORY DEVICE

(75) Inventors: Bruce M. Fleischer, Bedford Hills, NY (US); Thomas W. Fox, Hopewell Junction, NY (US); Hans M. Jacobson, White Plains, NY (US); Ravi Nair, Briarcliff Manor, NY (US); Daniel A. Prener, Croton-on-Hudson, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 991 days.

This patent is subject to a terminal disclaimer.

(21) Appl. No.: 13/569,359

(22) Filed: Aug. 8, 2012

(65) Prior Publication Data

US 2014/0040598 A1    Feb. 6, 2014

Related U.S. Application Data

(63) Continuation of application No. 13/566,135, filed on Aug. 3, 2012.

(51) Int. Cl.
*G06F 15/00* (2006.01)
*G06F 1/04* (2006.01)
(Continued)

(52) U.S. Cl.
CPC ....... *G06F 9/30036* (2013.01); *G06F 9/30065* (2013.01); *G06F 9/3879* (2013.01); *G06F 9/3887* (2013.01); *G06F 15/8084* (2013.01)

(58) Field of Classification Search
CPC .... G06F 9/30; G06F 15/8007; G06F 15/8053; G06F 15/8092; G06F 15/785; G06F 9/3885

See application file for complete search history.

(56) References Cited

U.S. PATENT DOCUMENTS 3,287,703 A    11/1966    Slotnick
4,980,817 A    12/1990    Fossum et al.
(Continued)

OTHER PUBLICATIONS

David A Patterson, Lecture 6: Vector Processing, 1998, 60 pgs, retrieved from the internet on May 7, 2015, retrieved from URL <http://www.cs.berkeley.edu/~pattrsn/252S98/Lec06-vector.pdf>.
(Continued)

*Primary Examiner* — Hyun Nam
(74) *Attorney, Agent, or Firm* — Cantor Colburn LLP

(57) ABSTRACT

Embodiments relate to vector processing in an active memory device. An aspect includes a system for vector processing in an active memory device. The system includes memory in the active memory device and a processing element in the active memory device. The processing element is configured to perform a method including decoding an instruction with a plurality of sub-instructions to execute in parallel. An iteration count to repeat execution of the sub-instructions in parallel is determined. Execution of the sub-instructions is repeated in parallel for multiple iterations, by the processing element, based on the iteration count. Multiple locations in the memory are accessed in parallel based on the execution of the sub-instructions.

18 Claims, 6 Drawing Sheets

(51) Int. Cl.
  *G06F 9/30* (2006.01)
  *G06F 9/38* (2006.01)
  *G06F 15/80* (2006.01)

(56) References Cited

U.S. PATENT DOCUMENTS

| | | | |
|---|---|---|---|
| 5,063,497 A * | 11/1991 | Cutler et al. | 712/6 |
| 5,115,393 A | 5/1992 | Kashiyama et al. | |
| 5,163,139 A * | 11/1992 | Haigh et al. | 712/206 |
| 5,437,043 A | 7/1995 | Fujii et al. | |
| 5,544,337 A | 8/1996 | Beard et al. | |
| 5,568,380 A | 10/1996 | Brodnax et al. | |
| 5,784,706 A | 7/1998 | Oberlin et al. | |
| 5,832,290 A | 11/1998 | Gostin et al. | |
| 5,903,769 A | 5/1999 | Arya | |
| 5,922,066 A | 7/1999 | Cho et al. | |
| 5,987,600 A | 11/1999 | Papworth et al. | |
| 6,079,008 A * | 6/2000 | Clery, III | G06F 9/30087 712/11 |
| 6,085,315 A * | 7/2000 | Fleck et al. | 712/241 |
| 6,173,366 B1 | 1/2001 | Thayer et al. | |
| 6,253,287 B1 | 6/2001 | Green | |
| 6,317,819 B1 * | 11/2001 | Morton | G06F 8/45 711/147 |
| 6,332,186 B1 | 12/2001 | Elwood et al. | |
| 6,366,999 B1 | 4/2002 | Drabenstott et al. | |
| 6,539,467 B1 | 3/2003 | Anderson et al. | |
| 6,785,842 B2 | 8/2004 | Zumkehr et al. | |
| 6,839,828 B2 | 1/2005 | Gschwind et al. | |
| 6,889,307 B1 | 5/2005 | Scheuerlein | |
| 6,950,923 B2 | 9/2005 | O'Connor et al. | |
| 7,196,708 B2 | 3/2007 | Dorojevets et al. | |
| 7,243,262 B2 | 7/2007 | Mukherjee et al. | |
| 7,277,988 B2 | 10/2007 | Gower et al. | |
| 7,302,532 B2 | 11/2007 | Sandorfi | |
| 7,308,607 B2 | 12/2007 | Reinhardt et al. | |
| 7,467,288 B2 | 12/2008 | Glossner, III et al. | |
| 7,493,516 B2 | 2/2009 | Ferren et al. | |
| 7,584,336 B2 | 9/2009 | Tremaine | |
| 7,594,055 B2 | 9/2009 | Gower et al. | |
| 7,783,860 B2 | 8/2010 | Luick et al. | |
| 7,793,084 B1 | 9/2010 | Mimar | |
| 7,877,582 B2 | 1/2011 | Gschwind et al. | |
| 7,908,460 B2 | 3/2011 | Liao et al. | |
| 7,949,853 B2 | 5/2011 | Sandon et al. | |
| 8,108,652 B1 | 1/2012 | Hui | |
| 8,255,745 B2 | 8/2012 | Ferren et al. | |
| 8,489,919 B2 | 7/2013 | Clark et al. | |
| 8,688,962 B2 | 4/2014 | Raikin et al. | |
| 2004/0193840 A1 | 9/2004 | Kirsch | |
| 2005/0055543 A1 | 3/2005 | Moyer | |
| 2006/0143509 A1 | 6/2006 | Okawa | |
| 2007/0050661 A1 | 3/2007 | Ferren et al. | |
| 2008/0005479 A1 | 1/2008 | Tremaine | |
| 2008/0059758 A1 | 3/2008 | Sachs | |
| 2008/0222444 A1 * | 9/2008 | Olofsson | G06F 9/30003 713/502 |
| 2009/0106526 A1 | 4/2009 | Luick et al. | |
| 2009/0172348 A1 | 7/2009 | Cavin | |
| 2009/0172364 A1 | 7/2009 | Sprangle et al. | |
| 2010/0036994 A1 | 2/2010 | Resnick | |
| 2010/0049951 A1 | 2/2010 | Gonion et al. | |
| 2010/0122069 A1 * | 5/2010 | Gonion | 712/216 |
| 2010/0268987 A1 | 10/2010 | Clark et al. | |
| 2010/0332764 A1 | 12/2010 | Jouppi | |
| 2011/0145543 A1 | 6/2011 | Damron | |
| 2011/0153983 A1 | 6/2011 | Hughes et al. | |
| 2011/0161642 A1 * | 6/2011 | Eichenberger et al. | 712/241 |
| 2011/0246828 A1 | 10/2011 | Monchiero et al. | |
| 2011/0264858 A1 | 10/2011 | Jeddeloh et al. | |
| 2012/0047398 A1 | 2/2012 | Vera et al. | |
| 2012/0060015 A1 | 3/2012 | Eichenberger et al. | |
| 2012/0124251 A1 | 5/2012 | Hnatko et al. | |
| 2012/0144089 A1 | 6/2012 | Hall et al. | |
| 2012/0233507 A1 * | 9/2012 | Gonion | 714/49 |
| 2012/0254591 A1 | 10/2012 | Hughes et al. | |
| 2014/0040597 A1 | 2/2014 | Fleischer et al. | |
| 2014/0040601 A1 | 2/2014 | Fleischer et al. | |
| 2014/0201498 A1 | 7/2014 | Ould-Ahmed-Vall et al. | |

OTHER PUBLICATIONS

David Patterson and John Hennessy, Computer Architecture A Quantitative Approach, 1996, Morgan Kauffman, Second Edition, 4 pages.

Ergin et al, Register Packing: Exploiting Narrow-width operands for reducing register file pressure, IEEE, 1072-4451/04, 12 pqs, retrieved from the internet on May 7, 2015, retrieved from URL <http://ieeexplore.ieee.org./stamp/stamp.jsp?tp=&arnumbr=155100>.

"Cell Architecture Explained Version 2," retrieved from http://www.blachford.info/computer/Cell/Cell0_v2.html on Jul. 23, 2012; pp. 1-3.

A. Fawibe, et al., "New Memory Organizations for 3D DRAM and PCMs," Archictecture of Computing Systems, ARCS 2012—25th International Conference, Proceedings Publication Date: Feb. 29, 2012; pp. 1-12.

H. P. Hofstee, et al., "Power Efficient Processor Architecture and The Cell Processor," IEEE Computer Society 2005; Proceedings of the 11th Int'l Symposium on High-Performance Computer Architecture; pp. 1-5.

IBM, "Logic on DIMM," ip.com; ip.com No. IPCOM000191776D; Jan. 14, 2010; pp. 1-4.

Wikipedia, "Cell (microprocessor)," retrieved from http://en.wikipedia.org/wiki/Cell_%microprocessor%29 on Jul. 23, 2012; pp. 1-17.

* cited by examiner

VECTOR PROCESSING IN AN ACTIVE MEMORY DEVICE

CROSS-REFERENCE TO RELATED APPLICATIONS

This is a continuation application that claims the benefit of U.S. patent application Ser. No. 13/566,135 filed Aug. 3, 2012, the contents of which are incorporated by reference herein in their entirety.

BACKGROUND

The present invention relates generally to computer memory, and more particularly to vector processing in an active memory device.

Computer systems often require a considerable amount of high speed memory, such as random access memory (RAM), to hold information, such as data and programs, when a computer is powered and operational. Memory device demands have continued to grow as computer systems have increased performance and complexity.

Communication from a main processor to locations on memory devices can involve relatively long data access times and latency. The time it takes for the main processor to access memory can be, for example, several hundred cycles, including time to realize the data is not in cache (for memory reads), time to traverse from a processor core of the main processor to I/O, across a module or other packaging, arbitration time to establish a channel to memory in a multi-processor/shared memory system, and time to get the data into or out of a memory cell.

SUMMARY

Exemplary embodiments include a system for vector processing in an active memory device. The system includes memory in the active memory device and a processing element in the active memory device. The processing element is configured to perform a method including decoding an instruction with a plurality of sub-instructions to execute in parallel. An iteration count to repeat execution of the sub-instructions in parallel is determined. Execution of the sub-instructions is repeated in parallel for multiple iterations, by the processing element, based on the iteration count. Multiple locations in the memory are accessed in parallel based on the execution of the sub-instructions.

Additional exemplary embodiments include a system for vector processing in an active memory device. The system includes memory in the active memory device and a processing element in the active memory device. The processing element is configured to perform a method including receiving a command from a requestor. An instruction is fetched based on the command, the instruction being fetched from an instruction buffer in the processing element. The instruction includes a plurality of sub-instructions to execute in parallel. An iteration count is determined to repeat execution of the sub-instructions in parallel. Execution of the sub-instructions is repeated in parallel for multiple iterations, by the processing element, based on the iteration count. Multiple locations in the memory are accessed in parallel based on the execution of the sub-instructions.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Figure 1:
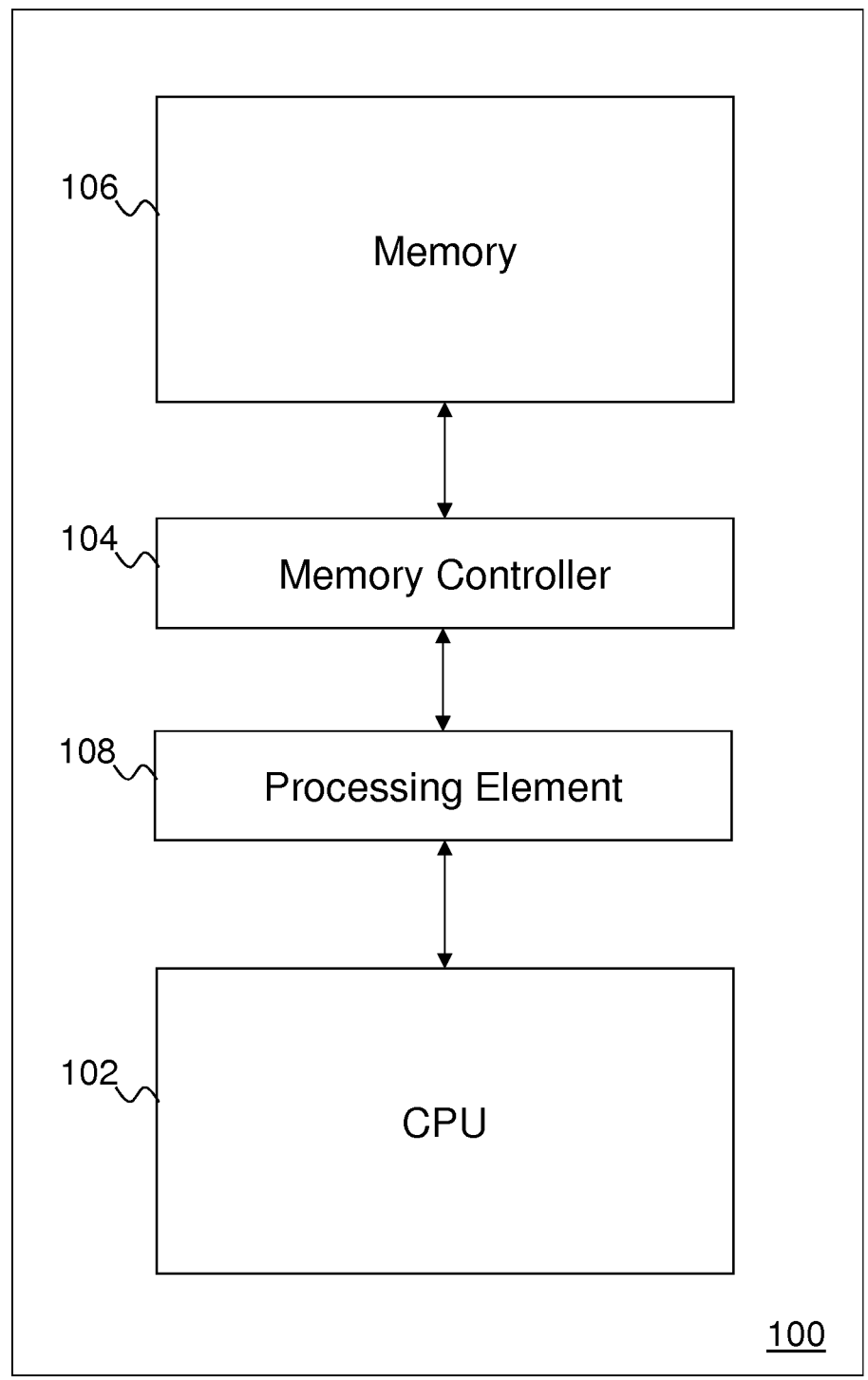
FIG. 1 illustrates a block diagram of a system for active memory in accordance with an embodiment.

An embodiment is directed to vector processing in an active memory device. The active memory device may be any suitable memory device including a plurality of memory elements (e.g., chips) connected to a logic portion and a processing element. In an embodiment, the active memory device includes layers of memory that form a three dimensional ("3D") memory device (e.g., a memory cube) where individual columns of chips form vaults in communication with the processing element and logic. The active memory device may include a plurality of processing elements configured to communicate to the chips and other processing elements. In an embodiment, a processing element accesses a selected address in a vault through an interconnect network. In addition, the interconnect network provides a communication path between processing elements on the active memory device as well as between processing elements and a main processor. Each vault may have an associated memory controller or logic unit that is also coupled to the interconnect network.

Embodiments include an active memory device that can perform a complex set of operations using multiple locations (e.g., data stored at specific addresses) within the active memory device as operands. Further, a process is provided whereby the instructions and operations are performed autonomously on these operands within the active memory device. Specifically, the instructions are stored within the active memory device itself and are not executed by a main processor. The stored instructions are provided to the processing elements for processing by the processing element in the active memory device. In one embodiment, the processing elements are programmable engines, including an instruction buffer, an instruction unit with branching capability and instruction decode, a mixture of vector, scalar, and mask register files, a plurality of load/store units for the movement of data between memory and the register files, and a plurality of execution units for the arithmetic and logical processing of various data types. Also included in the active memory device are address translation capabilities for converting virtual addresses to physical addresses, a unified Load/Store Queue to sequence data movement between the memory and the processing elements, and a processor communications unit, for communication with the main processor.

In an embodiment, the active memory device is configured to load configuration information or instructions from a part of the active memory device into a processing element following receiving a command from an external requestor, such as a main processor or another processing element. In addition, the processing element may perform virtual-to-real address translations that are computed while executing the loaded instructions. In an example, when performing a load instruction, the active memory device accesses an operand from a memory location and places the operand in a register in the processing element. A virtual address of the memory location is generated by the load instruction and is translated into a real address by the processing element. Similarly, when performing a store instruction, the active memory device writes a memory location with the contents (e.g., an operand) in a register in the processing element. A virtual address of the memory location is generated by the store instruction and is translated into a real address by the processing element.

Embodiments of the processing element in the active memory device also have the ability to read or to write operands in any part of the active memory device through the interconnect network. Specifically, a processing element may access other vaults in the active memory device using the interconnect network. In an embodiment, processing elements are pooled and coupled to the vaults via the interconnect network, where the processing elements are not physically located in the vault stack. In an embodiment, the interconnect network is a coupling device, such as a crossbar switch, configured to connect any processing element to any memory vault, provided the processing element and memory vault are coupled to the interconnect. In an embodiment, the interconnect network may couple a plurality of active memory devices, where the interconnect network provides a communication path between processing elements and memory vaults of separate devices.

In one embodiment, the processing element is included with the memory controller as part of the stack. In addition, the processing element may perform complex arithmetic and logic operations on the operands, and read and write end results back to locations in memory. The active memory device may return a single result value or signal to the main processor indicating that the results of the desired complex operation are ready in the active memory device, thus performing the high bandwidth processing on the active memory device and using a lower bandwidth communication between the active memory device and main processor.

The processing capabilities within an active memory device may reduce memory latency and energy consumption that would otherwise be experienced when memory is accessed by a processor residing in a separate chip. Instead of bringing data from memory to the separate processing chip through lower bandwidth communication paths, performing what is often quite simple calculations on the data, and then transferring the processed data back to memory, the main processor can configure the processing elements within the active memory device, and then instruct them to carry out the data processing tasks. This may be achieved by sending one or more commands from the main processor to the active memory device. In this scenario, the movement of data between the location where the data processing is performed and memory is greatly reduced, both in the distance it has to travel from the memory to the data processing location, and in the number of levels of cache traversed through a memory hierarchy.

FIG. 1 illustrates a block diagram of a system for storing and retrieving data in a memory in accordance with an embodiment. A system 100 depicted in FIG. 1 includes a computer processor (CPU) 102, a memory 106 having memory devices, as well as a memory controller 104 and processing element 108 for receiving and processing data from the computer processor 102 to be stored in the memory 106.

The memory controller 104 may be in communication with the computer processor 102 and receive write requests from the computer processor 102 without using functions of the processing element 108. The write requests contain data to be written to the memory 106 and a real address for identifying the location in the memory 106 to which the data will be written. The memory controller 104 stores data at a real address within the memory 106. The computer processor 102 can map the virtual address to a real address in the memory 106 when storing or retrieving data. The real address for a given virtual address may change each time data in the memory 106 is modified.

In an embodiment, the processing element 108 is in communication with the computer processor 102 and receives a command from the computer processor 102. The command may correspond to instructions stored in the memory 106 to perform write requests for data to be written to the memory 106. The command may also include a virtual address for identifying the location in the memory 106 to which the data will be written. The memory controller 104 and/or processing element 108 stores data at a real address within the memory 106. In an embodiment, the processing element 108 maps the virtual address to a real address in the memory 106 when storing or retrieving data. As described in further detail below, the computer processor 102 provides commands to the memory 106, where the processing element 108 receives the command and fetches corresponding instructions from the memory 106. The system 100 is one example of a configuration that may be utilized to perform the processing described herein. Although the system 100 has been depicted with only a single memory 106, memory controller 104, processing element 108 and computer processor 102, it will be understood that other embodiments would also operate in other systems with two or more of the memory 106, memory controller 104, processing element 108 or computer processor 102. In an embodiment, the memory 106, memory controller 104, processing element 108 and computer processor 102 are not located within the same computer. For example, the memory 106, processing element 108 and memory controller 104 may be located in one physical location (e.g., on a memory module) while the computer processor 102 is located in another physical location (e.g., the computer processor 102 accesses the memory controller 104 and/or processing element 108 via a network). In addition, portions of the processing described herein may span one or more of the memory 106, memory controller 104, processing element 108 and computer processor 102.

Figure 2:
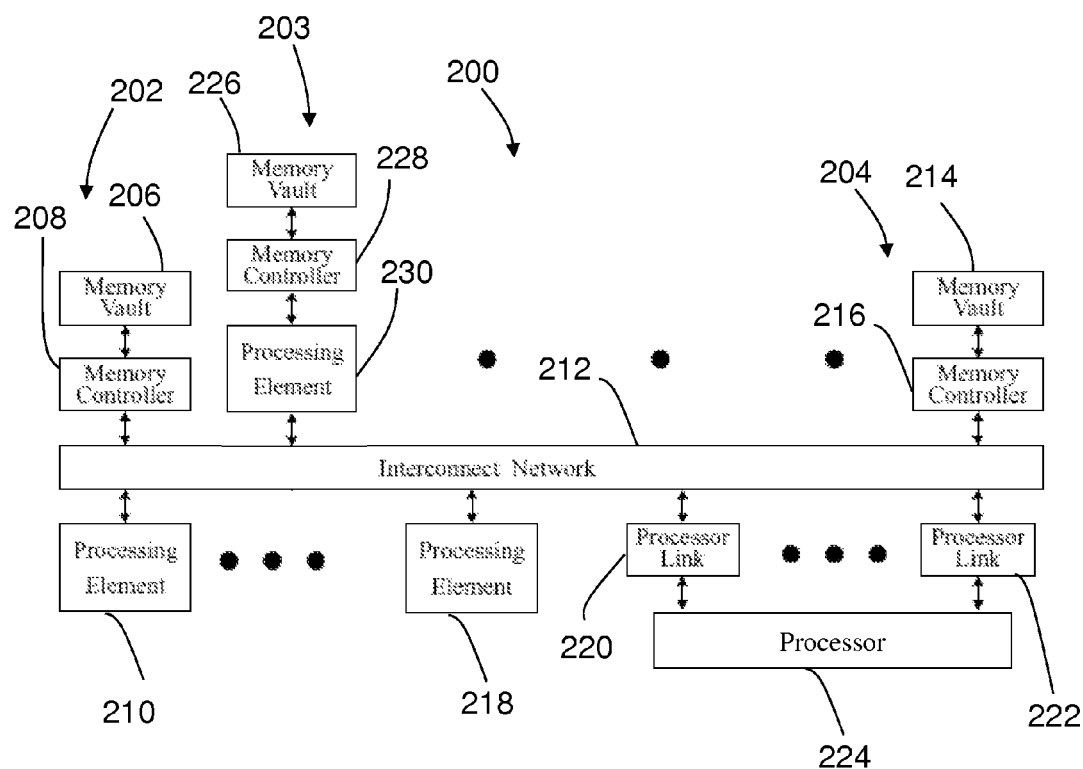
FIG. 2 illustrates a block diagram of a memory system with active memory in accordance with an embodiment.

FIG. 2 is a schematic diagram of an embodiment of a computer system 200 implementing active memory. In one embodiment, the computer system 200 includes an active memory device 202, an active memory device 203 and an active memory device 204. The active memory device 202 includes a memory vault 206, a memory controller 208 and a processing element 210. In an embodiment, the processing element 210, memory vault 206 and memory controller 208 are coupled and communicate via an interconnect network 212. Specifically, the processing element 210 communicates to the memory vault 206, memory controller 208 and other memory devices, such as active memory devices 203 and 204, via the interconnect network 212. The interconnect network 212 is also coupled to a main processor 224 by processor links 220 and 222. The interconnect network 212 provides a fast and high bandwidth path for communication between portions of the device, such processing elements, memory controllers and memory, to provide improved performance and reduced latency for the active memory.

The active memory device 203 includes a memory vault 226, a memory controller 228 and a processing element 230. In an embodiment, the processing element 230, memory vault 226 and memory controller 228 are all located on the same side of the interconnect network 212, such as within a single stack. By positioning the processing element 230 in the same stack as memory vault 226, the latency is reduced when accessing locations in the memory vault 226, thus further improving performance. In one embodiment, the active memory 204 includes a memory vault 214 and memory controller 216 coupled to processing element 210 and processing element 218 via the interconnect network 212. As depicted, the processing element 218 is located on the other side of the interconnect network 212 from the memory controller 216 and memory vault 214. In embodiments, the active memory devices 202, 203 and 204 include multiple layers of stacked addressable memory elements. Further, the stacks memory may be divided into memory vaults 206, 226 and 214, or three-dimensional blocked regions of the memory device which share a common memory controller and/or memory element, and are capable of servicing memory access requests to their domain of memory independently of one another.

In embodiments, the processing elements, memory vaults and memory controllers may be arranged in a suitable manner depending on the application. For example, one or more processing elements, such as processing element 218, may be positioned on one side of the interconnect network 212 and may operate as a pool of processing elements that are available for accessing any memory in the memory system coupled to the interconnect network 212. The pooled processing elements are not limited to accessing a particular memory vault and, thus, one or more elements may be utilized upon receiving a command from the main processor 224. Accordingly, processing element 218 may be configured to access each memory vault 206, 226 and 214. In another embodiment, one or more processing element, such as processing element 230, is located as part of a stack including a memory vault 226 and memory controller 228. In such a configuration, the processing element 230 is configured to access memory vault 226 coupled to the interconnect network 212, including memory vaults 206 and 214. In one embodiment, one or more processing element, such as processing element 210, is positioned on an opposite side of the interconnect network 212 from the memory vault 206 and memory controller 208. In the configuration, the processing element 210 is configured to access any memory coupled to the interconnect network 212, including memory vaults 226 and 214.

In an embodiment, the computer system may include a plurality of active memory devices, such as the active memory devices 202, 203 and 204. Further, each active memory device may include a plurality of stacks, each stack including a memory vault, memory controller and associated processing element. In one example, the number of processing elements may be greater than the number of memory vaults. In another embodiment, the memory devices may include fewer processing elements than memory vaults. In embodiments, the processing elements are pooled and available to access any memory in the system. For example, a memory device may include 16 memory vaults and memory controllers, but only eight processing elements. The eight processing elements are pooled, and utilized as resources for accessing any memory vaults coupled to the interconnect network. In another example, a memory device may be passive, where the device is controlled by processing elements of active memory devices coupled to the interconnect network.

Figure 3:
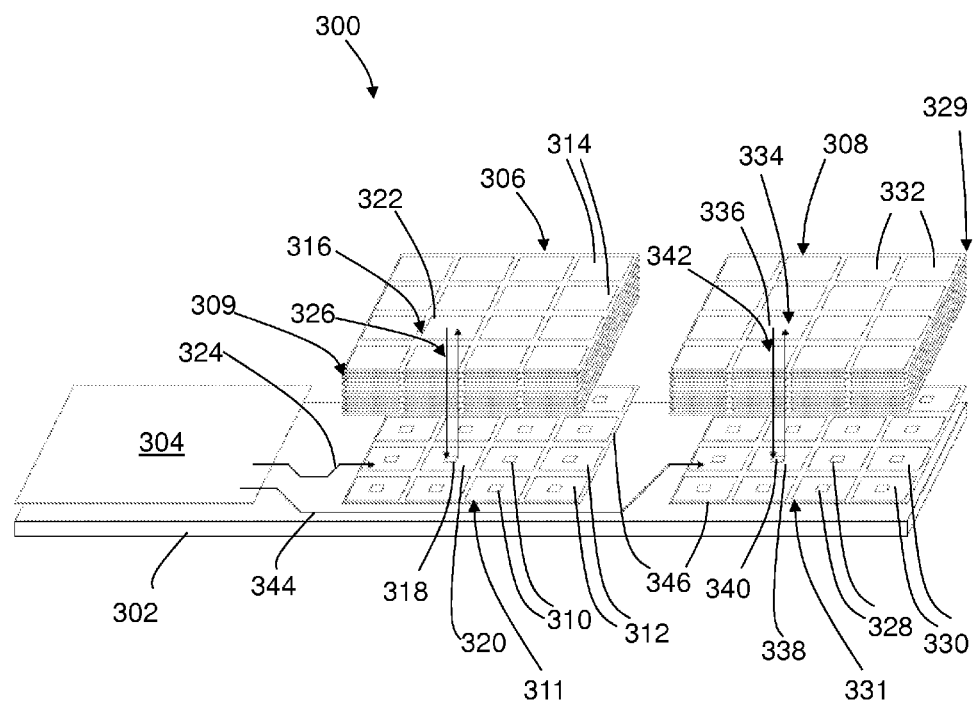
FIG. 3 illustrates a schematic diagram of a memory system with active memory in accordance with an embodiment.

FIG. 3 is a diagram of an exemplary computer system 300 implementing active memory. The computer system 300 includes a circuit board 302, a main processor 304, active memory device 306 and active memory device 308. The active memory device 306, active memory device 308 and main processor 304 are disposed on the circuit board 302. As depicted, portions of the active memory devices 306 and 308 are exploded to show details of the computer system 300 arrangement. The active memory devices 306 and 308 communicate to the main processor 304 via signal paths 324 and 344, respectively. As depicted, the active memory 306 device is arranged in layers, where a base layer 311 includes a plurality of memory controllers 310 and processing elements 312. For example, the active memory device 306 includes layers 309 of memory placed on top of the base layer 311, where the layers 309 each have a plurality of memory elements. As depicted, the base layer 311 also includes an interconnect network 346 to enable high bandwidth communication between memory, memory controllers and processing elements in the device.

In an embodiment, the active memory device 306 includes a plurality of memory vaults 314, where each memory vault 314 includes a memory element from each layer 309, the memory vaults 314 positioned adjacent to memory controllers 310 and processing elements 312. Specifically, the exemplary active memory device 306 includes layers of 16 memory elements, where the element layers form stacks, including a stack 316, where the stack 316 includes a memory vault 322 disposed above a memory controller 318 and a processing element 320. A high bandwidth communication path 326 provides a high bandwidth, direct and substantially reduced length (e.g., as compared to paths 324, 344) communication path between the processing element 320 and memory locations within the memory vault 322, thus reducing latency and power consumption for memory accesses. For example, the processing element 320 may receive a command from the main processor 304, load instructions from within the active memory device 306 based on the command, and, as part of the loaded instructions, access data at a location in the memory vault 314 and perform a complex operation on the data in the processing element 320. Further, the processing element 320 may also store data, such as the result, in the memory vault 314 and transmit a value or signal to the main processor 304 following execution of the command. In an embodiment, the processing element 320 stores or writes data (e.g. an operand) from a register in the processing element 320 to the memory vault 314. The processing element 320 is also configured to translate addresses from virtual-to-real and real-to-virtual as part of the read or store operations. Thus, the processing element 320 provides instruction loading, address translation, complex operations and other tasks local to the memory to reduce latency, save power and free up the main processor 304 to perform other tasks.

Similarly, the active memory device 308 includes a plurality of memory controllers 328 and processing elements 330 disposed on a base layer 331. In an embodiment, the active memory 308 includes layers 329 of memory devices placed on top of the base layer 331, where the layers 329 each have a plurality of memory devices. The base layer 331 also includes an interconnect network 346 to enable high bandwidth communication between memory and processing elements in the device. In an embodiment, the interconnect networks 346 of active memory device 306 and active memory device 308 are coupled and allow communication between processing elements and memory on separate devices.

In an embodiment, the active memory device 308 includes a plurality of memory vaults 332, where each memory vault 332 includes a memory element from each layer 329, the memory vaults 332 are positioned adjacent to memory controllers 328 and processing elements 330. The exemplary active memory device 308 includes 16 stacks, including stack 334, where the stack 334 includes a memory vault 336 disposed above a memory controller 340 and a processing element 338. A high bandwidth communication path 342 provides communication between the processing element 330 and memory locations within the memory vault 336.

Figure 4:
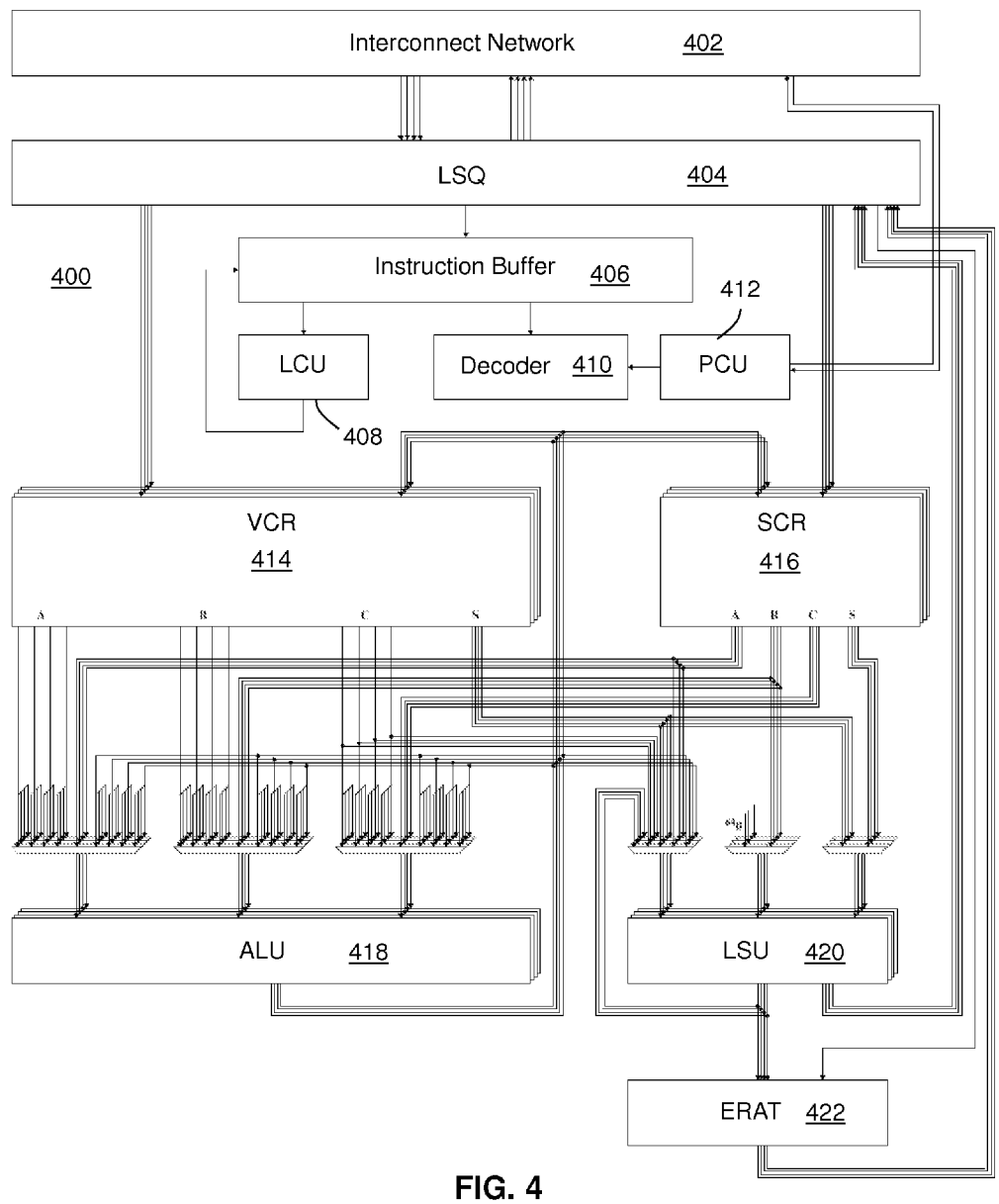
FIG. 4 illustrates a block diagram of a processing element for vector processing in an active memory device in accordance with an embodiment.

FIG. 4 depicts an example of a processing element 400 coupled to an interconnect network 402 as an embodiment of one of the processing elements of FIGS. 1-3. The processing element 400 is a programmable vector processing element, situated in an active memory device, such as one of the active memory devices of FIGS. 1-3. In the example of FIG. 4, the processing element 400 includes a load-store queue (LSQ) 404 coupled to the interconnect network 402 and to an instruction buffer 406. The instruction buffer 406 is also coupled to a lane control unit (LCU) 408 and a decoder 410. A processor communication unit (PCU) 412 provides a communication interface between the processing element 400 and the main processor or other processing elements through the interconnect network 402. The LSQ 404 is also coupled to a vector computation register file (VCR) 414 and a scalar computation register file (SCR) 416. The VCR 414 and SCR 416 are coupled through multiple multiplexers to an arithmetic logic unit (ALU) 418 and a memory-access unit 420, also referred to as a load-store unit (LSU) 420. The ALU 418 is coupled to itself and to the LSU 420 through multiplexers, and is also coupled to the VCR 414 and the SCR 416. The LSU 420 may also be coupled to itself, to the LSQ 404, to an effective-to-real address translation unit (ERAT) 422, to the VCR 414 and to the SCR 416 (all connections not depicted). The ERAT 422 is also coupled to the LSQ 404. As will be appreciated, numerous other connections and elements can be included in the processing element 400. For example, connections between the decoder 410 and other elements are not depicted for clarity. Additionally, depicted connections in FIG. 4 can be modified or omitted, such as the depicted connection between decoder 410 and PCU 412.

The processing element 400 supports an instruction set architecture including a broad range of arithmetic capabilities on many data types. Vector processing capabilities of the processing element 400 allows for single instruction, multiple data (SIMD) in time, while SIMD in a spatial dimension is also supported. The instruction buffer 406 holds instructions (also referred to as "lane instructions"), which are fetched and executed in order subject to branching.

The instruction buffer 406 can load instructions on demand when the next address points to an entry for an instruction and the entry does not already contain the instruction. Instructions may also be prefetched on a block basis or fetched in response to one or more special instructions located in the instruction buffer 406. Dynamic loading and reloading based on misses and special instructions provide an effectively larger instruction store than the physical size of the instruction buffer 406. When starting execution, the processing element 400 may be provided with a base address from which the instructions are read from memory into the instruction buffer 406. If an invalid entry is encountered in the instruction buffer 406, its physical entry address is added to the base address and the instruction located at that place in memory is fetched and stored into the instruction buffer entry. Once the entry becomes valid the processing element 400 can resume instruction fetching from the instruction buffer 406 and execute the instruction. To increase the size of the code that can be run, the instruction buffer 406 can replace existing instructions with new ones. This may be performed through special instructions in the instruction buffer 406 that provide an address offset to where the desired instruction is located in memory relative to a known base address stored in a register in the processing element 400. If the new instruction to load is known in advance, the request for the new instruction can be made sufficiently in advance such that it is available in the instruction buffer 406 once the program reaches that point of execution.

In an embodiment, each lane instruction contains 9 sub-instructions for execution in various units within the processing element 400. An iteration count may be included within the lane instruction, allowing the sub-instructions to be repeated up to a predetermined number of times (e.g., up to 32 times). This facilitates SIMD in time. The LCU 408 can manage the iteration count and determine when to advance to a next instruction or repeat execution of the same instruction. In an embodiment, arithmetic pipelines of ALU 418 are 64 bits wide, and spatial SIMD is supported by virtue of the ability to execute data types smaller than 64 bits in parallel, simultaneously as multiple execution slots. For example, assuming that a lane instruction includes 9 sub-instructions, execution of the sub-instructions can be performed in the LCU 408 for lane control, and in four processing slices, each of which includes an ALU 418 and an LSU 420. Pairs of the VCR 414 and the SCR 416 can be implemented per processing slice and are accessible by each pair of the ALU 418 and LSU 420. Accordingly, the VCR 414, SCR 416, ALU 418, LSU 420, and associated multiplexers are depicted as stacks of four elements to indicate 4 processing slices in the example of FIG. 4.

At the processing slice level, computation can occur on floating-point and fixed-point data types at, for example, a 64-bit granularity in a temporal SIMD manner on 64-bit vector elements, and in a temporal and spatial SIMD manner on narrower vector sub-elements, which can be 32-bits, 16-bits, or 8-bits wide.

Each processing slice within the processing element 400 includes a memory access pipeline (load/store pipeline) and an arithmetic pipeline. Managing flow through the LSU 420 as a load/store pipeline can enable computation of one address per vector data element or sub-element. The processing element 400 provides the ability to perform associated fixed-point effective address (i.e., virtual address) computations. The arithmetic pipeline through the ALU 418 can include a robust assortment of floating-point and fixed-point operations to support a variety of workloads.

The LSU 420 may support load and store operations of, for example, 8, 4, 2 and 1 byte(s) and load and store operations of 4, 2, and 1 byte(s) to and from registers with packed data.

The ALU 418 may support copy operations between register files, arithmetic, rounding and conversion, comparison, and maximum and minimum operations on floating-point data types of double-precision (64 bits) and single-precision (32 bits), and arithmetic, rotate/shift, comparison, logical, count leading zeros, and ones population count operations on fixed-point data types of doubleword (64 bits), word (32 bits), halfword (16 bits) and bytes (8 bits).

In an embodiment, the computational model of a processing slice within the processing element 400 is a vector single instruction multiple data (SIMD) model with the VCR 414 and SCR 416. The VCR 414 can support multiple dimensions of registers, while the SCR 416 supports a single dimension of registers. For example, the VCR 414 can include 16 vector entries with 32 elements each of 64 bits, and the SCR 416 can include 16 register entries with 1 element each of 64 bits, although numerous other configurations may be supported. A variable number of execution slots can be used, operating on an equal number of sub-elements, whereby the sub-elements taken together add up to one register element (either VCR 414 or SCR 416) of 64 bits in this example. The number of execution slots and the corresponding number of vector sub-elements depend upon the data type of the instruction. Examples of data types and sizes of various formats include: floating-point with double-precision (64-bit) and single-precision (32-bit) data types and fixed-point for a doubleword (64-bit), word (32-bit), halfword (16-bit), and byte (8-bit) data types.

Figure 5:
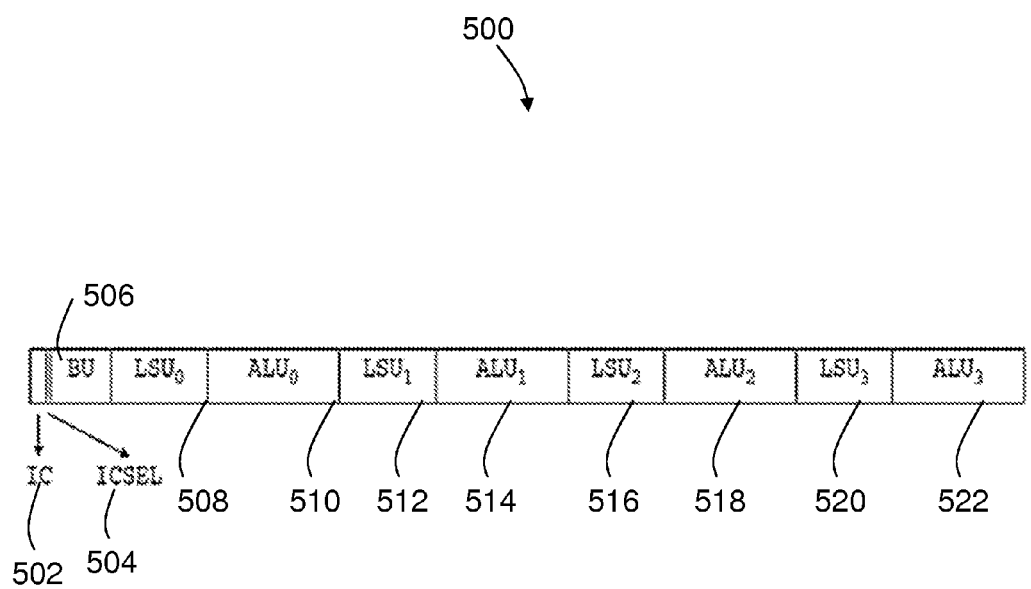
FIG. 5 illustrates an example of a lane instruction format for vector processing in an active memory device in accordance with an embodiment.

An example of a lane instruction format 500 is depicted in FIG. 5 as a processing element operation which utilizes and controls all of the resources within processing element 400 of FIG. 4. In the example of FIG. 5, the lane instruction format 500 includes a 5-bit iteration count (IC) field 502, a 1-bit iteration count select (ICS) field 504, and nine sub-instructions. The sub-instructions include a 19-bit branch (BU) sub-instruction 506, which executes once and controls the sequence of lane instruction execution, four 31-bit memory access or load-store (LSU) sub-instructions 508, 512, 516, 520 (one per processing slice 0-3), which execute one or more times per lane instruction, and four 41-bit arithmetic-logical (ALU) sub-instructions 510, 514, 518, 522 (one per processing slice 0-3), which execute one or more times per lane instruction. The IC field 502 within a lane instruction, or an iteration count register, as selected by the ICS field 504, determines the number of times that the ALU and LSU sub-instructions are repeated. The BU sub-instruction 506 may be referred to generally as a lane control (LCU) sub-instruction for the LCU 408 and can include other control operations, such as returning, pausing, and no-operation, in addition to branching.

Each sub-instruction is a processor operation which utilizes and controls all of the resources within a given unit within the processing element 400. If a sub-instruction contains all scalar registers in the SCR 416 for the target and source(s), then the sub-instruction can be executed during execution of a first element of the lane instruction. Lane control sub-instructions, including branch sub-instructions, can be executed during execution of the last iteration of the lane instruction. Conditions for branch sub-instructions may be evaluated during execution of the first element of the lane instruction.

Figure 6:
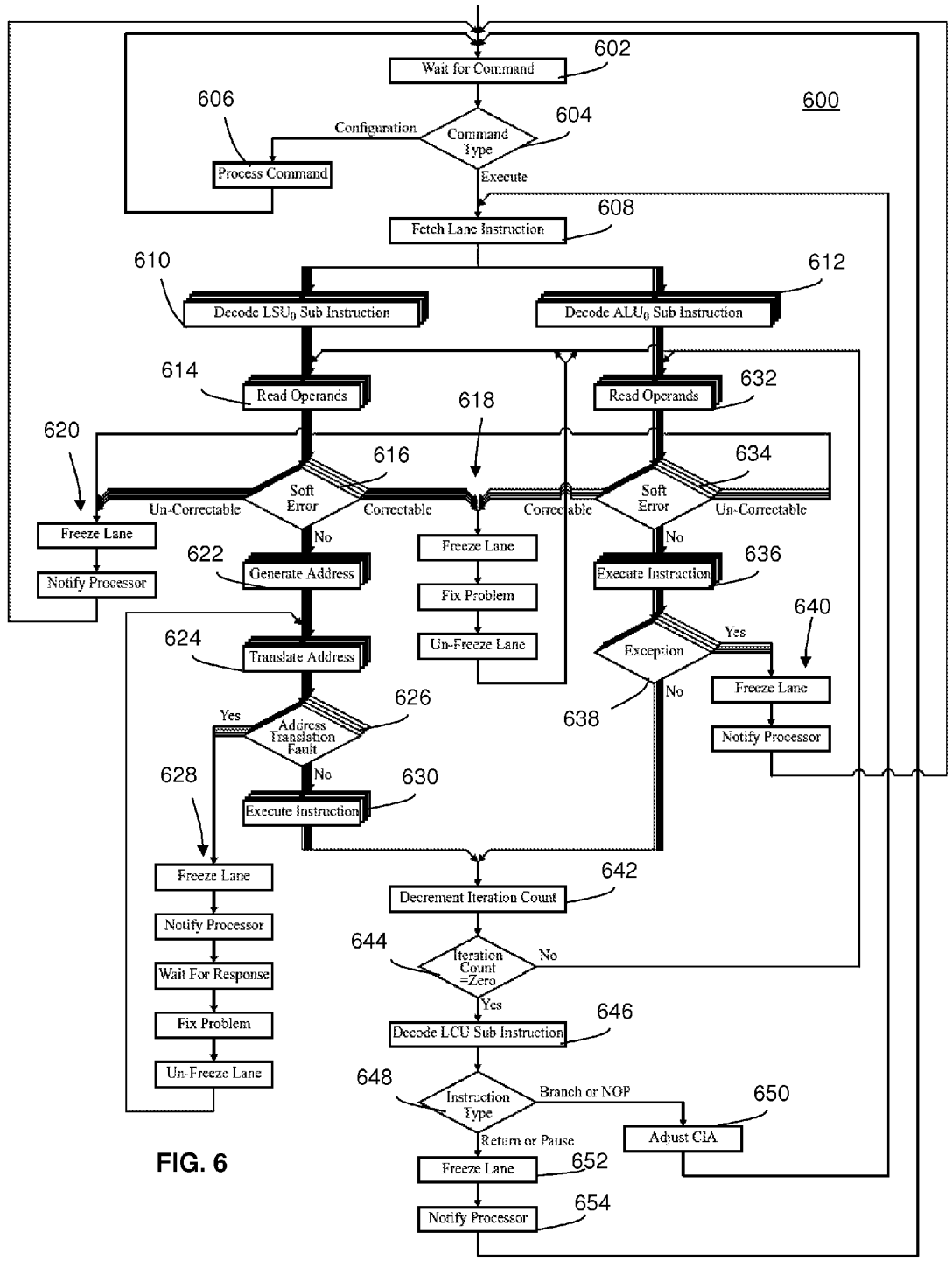
FIG. 6 illustrates a flow diagram of a process for vector processing in an active memory device in accordance with an embodiment.

FIG. 6 is a process 600 for vector processing in an active memory device, such as the active memory devices of FIGS. 1-3. The blocks depicted in FIG. 6 may be performed by one of the processing elements of FIGS. 1-4 in an active memory device. For example, the blocks may be performed by a processing element in an active memory device, where the processing element accesses portions of memory (e.g., memory vaults sharing a stack with the processing element) and performs operations on data accessed from the memory. For purposes of explanation, the processing element is described in reference to processing element 400 of FIG. 4.

At block 602, processing element 400 in an active memory device waits for a command. The command may be sent by a requestor to the active memory device to perform one or more actions, where the requestor may be a main processor, a network interface, an I/O device or an additional active memory device in communication with the processing element 400. At block 604, the command is received and the command type is determined, where the command type may be a configuration command or an execute command. At block 606, if the processing element receives a configuration command, it is processed by the processing element 400. The configuration command may be a command that loads configuration information from the memory within the active memory device directly into the processing element 400. By providing the configuration information in the active memory device, the processing element 400 is able to be properly configured rapidly after receiving the command. In an embodiment, configuration information may include information used to translate between virtual addresses and real addresses in the memory, e.g., at ERAT 422. Further, configuration information may include information to maintain coherence, by ensuring accuracy and consistency, of memory mapping and translation between the processing element 400 and a requestor (e.g., main processor). In an example, the information to maintain coherence includes information to ensure virtual-to-real address mapping in the processing element 400 matches the virtual-to-real address mapping information accessed by the main processor for commands and control operations (e.g., a table in the main processor). This can provide improved accuracy when accessing data within the memory by the requestor. Loading of instructions into the instruction buffer 406 may also be performed using one or more configuration commands. After the configuration command is processed in block 606, the processing element 400 waits for a command in block 602. In an embodiment, a command may include configuration and execute commands, where the configuration command is performed first and is followed by the execute command.

Returning to block 604, if the command type is an execute command, the processing element 400 fetches an instruction, e.g., a lane instruction, from the instruction buffer 406 based on the command at block 608. Upon fetching the instruction, an iteration count source is determined based on the ICSEL field 504 from the instruction as either IC field 502 or a value in an iteration count register. The iteration count is set based on the iteration count source. In embodiments, the instruction includes multiple sub-instructions for parallel execution. Parallel execution of sub-instructions can be repeated for multiple iterations based on the iteration count. Processing slice pairs operate in parallel to process pairs of memory access sub-instructions in LSU 420 in parallel with arithmetic-logical sub-instructions in ALU 418. The decoder 410 partitions the instruction into sub-instructions and passes the sub-instructions to corresponding functional units for further decoding and processing. For example, LSU sub-instructions are passed to blocks 610 and ALU sub-instructions are passed to blocks 612. In the example of FIG. 6, there are 4 stacked blocks 610 and 612 corresponding to separate processing slices being performed in parallel.

At blocks 610, LSU sub-instructions are decoded and operands for the LSU sub-instructions are read at blocks 614. Operands can be accessed from the VCR 414 and/or the SCR 416. At blocks 616, soft error checks can be performed for each of the operands read at blocks 614 prior to instruction execution. Based on detecting a correctable error, an error correction process 618 is performed that includes, freezing instruction processing, fixing the correctable error, and resuming (un-freezing) instruction processing. Based on detecting an uncorrectable error, an uncorrectable error process 620 is performed, including freezing instruction processing and notifying a main processor. At blocks 622, if no error was detected at blocks 616, an address is generated for the memory access sub-instruction for each processing slice. The generated address may be a virtual address; therefore, at blocks 624 the ERAT 422 can translate the generated address to a real address of the memory for each processing slice. At blocks 626, a check for an address translation fault based on translating the generated address is performed for each processing slice. Based on identifying an address translation fault, a fault handling process 628 is performed, including: freezing instruction processing, notifying the main processor, waiting for a response from the main processor, fixing a problem causing the address translation fault, and resuming (un-freezing) instruction processing. If no address translation fault is detected, the LSU sub-instructions from each processing slice are executed at blocks 630 and can result in accessing multiple locations in the memory in parallel based on the execution of the sub-instructions.

Returning to blocks 612, ALU sub-instructions are decoded and operands for the ALU sub-instructions are read at blocks 632. Operands can be accessed from the VCR 414 and/or the SCR 416. At blocks 634, soft error checks can be performed for each of the operands read at blocks 632 prior to instruction execution. Based on detecting a correctable error, the error correction process 618 is performed that includes, freezing instruction processing, fixing the correctable error, and resuming (un-freezing) instruction processing. Based on detecting an uncorrectable error, the uncorrectable error process 620 is performed, including freezing instruction processing and notifying a main processor. At blocks 636, if no error was detected at blocks 634, the ALU sub-instructions are executed for each processing slice. As part of sub-instruction execution, at least one of the operands can be partitioned as a plurality of sub-elements based on a data type of an ALU sub-instruction. The ALU 418 can perform an operation of the ALU sub-instruction in parallel execution slots on each of the sub-elements for each processing slice. The LSU 420 can support sub-elements by computing an address per sub-element. For example, one ALU sub-instruction per slice may perform a single operation on a 64-bit value, 2 operations in parallel on 2 32-bit values, 4 operations in parallel on 4 16-bit values or 8 operations in parallel on 8 8-bit values. Accordingly, a single instruction can perform 32 ALU operations in parallel as 8 execution slots operating on 8-bit values in 4 processing slices, while also performing 4 LSU operations in the 4 processing slices in parallel. At blocks 638, if an exception is detected (e.g., divide by zero, etc.) based on executing the ALU sub-instructions, an exception handling process 640 is performed, including freezing instruction processing and notifying the main processor.

At block 642, once all LSU and ALU sub-instruction execution is complete for the current iteration, the iteration count is decremented. At block 644, if the iteration count is not zero, then flow returns to blocks 614 and 632 to continue execution of the same LSU and ALU sub-instructions with a next set of operands. If the iteration count is zero, then a lane control (LCU) sub-instruction is decoded from the instruction at block 646. At block 648, based on an instruction type of the LCU sub-instruction of a branch sub-instruction or a no-operation sub-instruction, a current instruction address is adjusted to identify a next instruction in the instruction buffer 406 at block 650 and flow returns to block 608. At block 648, based on an instruction type of the LCU sub-instruction of a return sub-instruction or a pause sub-instruction, instruction processing is frozen at block 652, the main processor is notified at block 654, and flow returns to block 602.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A system for vector processing in an active memory device, the system comprising:
a memory in the active memory device; and
a processing element in the active memory device, the processing element configured to perform a method comprising:

decoding, in the processing element, an instruction comprising a plurality of sub-instructions to execute in parallel;

determining an iteration count to repeat execution of the sub-instructions in parallel based on decoding an iteration count source field of the instruction that defines whether to set the iteration count based on an iteration count field of the instruction or based on an iteration count register;

repeating execution of the sub-instructions in parallel for multiple iterations, by the processing element, based on the iteration count;

accessing multiple locations in the memory in parallel based on the execution of the sub-instructions;

identifying a lane control sub-instruction in the instruction based on the decoding of the instruction, the lane control sub-instruction controlling a sequence of instruction execution and positioned in parallel with the sub-instructions to execute in parallel; and executing the lane control sub-instruction, by the processing element, only once after execution of the sub-instructions is performed in parallel for multiple iterations.

2. The system of claim 1, wherein the sub-instructions comprise at least a pair of a memory access sub-instruction in parallel with an arithmetic-logical sub-instruction, and the processing element is further configured to perform:

flowing the memory access sub-instruction to a load-store unit in the processing element; and flowing the arithmetic-logical sub-instruction to an arithmetic logic unit in the processing element to execute the memory access sub-instruction in parallel with the arithmetic-logical sub-instruction.

3. The system of claim 2, wherein the processing element is further configured to perform:

accessing one or more of: a vector computation register file and a scalar computation register file in the processing element for operands to execute the memory access sub-instruction in the load-store unit; and accessing one or more of: the vector computation register file and the scalar computation register file in the processing element for operands to execute the arithmetic-logical sub-instruction in the arithmetic logic unit.

4. The system of claim 3, wherein the processing element is further configured to perform:

partitioning at least one of the operands as a plurality of sub-elements based on a data type of the arithmetic-logical sub-instruction;

performing, by the arithmetic logic unit, an operation of the arithmetic-logical sub-instruction in parallel execution slots on each of the sub-elements; and computing, by the load-store unit, an address per sub-element.

5. The system of claim 3, wherein the processing element is further configured to perform:

flowing an output of the load-store unit to one or more of: the load-store unit, an effective-to-real address translation unit, a load-store queue, the vector computation register file, and the scalar computation register file; and flowing an output of the arithmetic logic unit to one or more of: the arithmetic logic unit, the load-store unit, the vector computation register file, and the scalar computation register file.

6. The system of claim 3, wherein the processing element is partitioned into multiple processing slices operable in parallel, each processing slice comprising a pair of the load-store unit and the arithmetic logic unit, and an associated pair of the vector computation register file and the scalar computation register file, and the processing element is further configured to perform:

flowing an output of the arithmetic logic unit of one processing slice to an input of one or more of: the load-store unit and the arithmetic logic unit.

7. The system of claim 3, wherein the processing element is further configured to perform:

performing an error check on the operands prior to executing the memory access sub-instruction and the arithmetic-logical sub-instruction.

8. The system of claim 1, wherein the lane control sub-instruction is a branch sub-instruction executed by the processing element during execution of a last iteration of the instruction based on conditions evaluated during execution of a first element of the instruction.

9. A system for vector processing in an active memory device, the system comprising:

a memory in the active memory device; and a processing element in the active memory device, the processing element configured to perform a method comprising:

receiving, in the processing element, a command from a requestor;

fetching, in the processing element, an instruction based on the command, the instruction being fetched from an instruction buffer in the processing element;

decoding, in the processing element, the instruction comprising a plurality of sub-instructions to execute in parallel;

determining an iteration count to repeat execution of the sub-instructions in parallel based on decoding an iteration count source field of the instruction that defines whether to set the iteration count based on an iteration count field of the instruction or based on an iteration count register;

repeating execution of the sub-instructions in parallel for multiple iterations, by the processing element, based on the iteration count;

accessing multiple locations in the memory in parallel based on the execution of the sub-instructions;

identifying a lane control sub-instruction in the instruction based on the decoding of the instruction, the lane control sub-instruction controlling a sequence of instruction execution and positioned in parallel with the sub-instructions to execute in parallel; and executing the lane control sub-instruction, by the processing element, only once after execution of the sub-instructions is performed in parallel for multiple iterations.

10. The system of claim 9, wherein the processing element is further configured to perform:

fetching a special instruction from the instruction buffer to load a new instruction from the memory; and replacing an entry in the instruction buffer with the new instruction based on executing the special instruction.

11. The system of claim 9, wherein the active memory device is a three-dimensional memory cube, the memory is divided into three-dimensional blocked regions as memory vaults, and accessing multiple locations in the memory is performed through one or more memory controllers in the active memory device.

12. The system of claim 9, wherein the sub-instructions comprise at least a pair of a memory access sub-instruction in parallel with an arithmetic-logical sub-instruction, and the processing element is further configured to perform:
    flowing the memory access sub-instruction to a load-store unit in the processing element; and
    flowing the arithmetic-logical sub-instruction to an arithmetic logic unit in the processing element to execute the memory access sub-instruction in parallel with the arithmetic-logical sub-instruction.

13. The system of claim 12, wherein the processing element is further configured to perform:
    accessing one or more of: a vector computation register file and a scalar computation register file in the processing element for operands to execute the memory access sub-instruction in the load-store unit; and
    accessing one or more of: the vector computation register file and the scalar computation register file in the processing element for operands to execute the arithmetic-logical sub-instruction in the arithmetic logic unit.

14. The system of claim 13, wherein the processing element is further configured to perform:
    partitioning at least one of the operands as a plurality of sub-elements based on a data type of the arithmetic-logical sub-instruction;
    performing, by the arithmetic logic unit, an operation of the arithmetic-logical sub-instruction in parallel execution slots on each of the sub-elements; and
    computing, by the load-store unit, an address per sub-element.

15. The system of claim 13, wherein the processing element is further configured to perform:
    performing an error check on the operands prior to executing the memory access sub-instruction and the arithmetic-logical sub-instruction;
    based on detecting a correctable error, freezing instruction processing, fixing the correctable error, and resuming instruction processing; and
    based on detecting an uncorrectable error, freezing instruction processing and notifying a main processor.

16. The system of claim 13, wherein the processing element is further configured to perform:
    generating an address for the memory access sub-instruction;
    translating the generated address to a real address of the memory;
    checking for an address translation fault based on translating the generated address; and
    based on identifying the address translation fault, freezing instruction processing, notifying the main processor, waiting for a response from the main processor, fixing a problem causing the address translation fault, and resuming instruction processing.

17. The system of claim 13, wherein the processing element is further configured to perform:
    detecting an exception based on executing the arithmetic-logical sub-instruction; and
    based on detecting the exception, freezing instruction processing and notifying the main processor.

18. The system of claim 13, wherein the processing element is further configured to perform:
    decrementing the iteration count based on executing the memory access sub-instruction and the arithmetic-logical sub-instruction;
    based on decrementing the iteration count to zero, decoding the lane control sub-instruction from the instruction;
    based on determining that the lane control sub-instruction is one of: a return sub-instruction and a pause sub-instruction, freezing instruction processing and notifying a main processor; and
    based on determining that the lane control sub-instruction is one of: a branch sub-instruction and a no-operation sub-instruction, adjusting a current instruction address to identify a next instruction in the instruction buffer.

* * * * *